(12) United States Patent
Larson

(10) Patent No.: US 9,777,931 B2
(45) Date of Patent: Oct. 3, 2017

(54) METHOD AND APPARATUS FOR POSITIONING HEATING ELEMENTS

(71) Applicant: PROGRESS PROFILES SPA, Asolo (TV) (IT)

(72) Inventor: David D. Larson, Golden, CO (US)

(73) Assignee: PROGRESS PROFILES SPA (IT)

( * ) Notice: Subject to any disclaimer, the term of this patent is extended or adjusted under 35 U.S.C. 154(b) by 0 days.

(21) Appl. No.: 15/260,848

(22) Filed: Sep. 9, 2016

(65) Prior Publication Data

US 2016/0377299 A1   Dec. 29, 2016

Related U.S. Application Data

(62) Division of application No. 14/829,108, filed on Aug. 18, 2015, now Pat. No. 9,625,163.

(60) Provisional application No. 62/038,733, filed on Aug. 18, 2014.

(51) Int. Cl.
*F24D 13/02* (2006.01)
*E04F 15/18* (2006.01)

(52) U.S. Cl.
CPC ............ *F24D 13/02* (2013.01); *E04F 15/182* (2013.01); *E04F 15/185* (2013.01); *E04F 2290/023* (2013.01); *Y02B 30/26* (2013.01)

(58) Field of Classification Search
CPC ........ F24D 3/142; F24D 3/141; F24D 13/024; F24D 3/144; F24D 13/02; E04F 15/18; E04F 15/182; E04F 2203/04; E04F 2290/023; H05B 3/06; H05B 3/56; Y02B 30/26

USPC .............. 237/69, 1 R; 165/49, 168, 53, 56; 52/220.3, 386

See application file for complete search history.

(56) References Cited

U.S. PATENT DOCUMENTS

| | | |
|---|---|---|
| 254,269 A | 2/1882 | Brown |
| 1,485,370 A | 3/1924 | Cumfer |
| 1,549,773 A | 8/1925 | Hynes |
| 2,139,512 A | 12/1938 | Nagorny |
| 2,956,785 A | 10/1960 | Richl |

(Continued)

FOREIGN PATENT DOCUMENTS

| | | |
|---|---|---|
| CA | 1186470 | 5/1985 |
| CH | 657690 | 9/1986 |

(Continued)

OTHER PUBLICATIONS

Polypipe Brochure; "Redefining Heating Systems," www.ufch.com; Polyplumb: Hot & Cold Plumbing & Heating System; © 2006, Polypipe Group; Printed: Feb. 2007, 44 pages.

(Continued)

*Primary Examiner* — Joshua J Michener
*Assistant Examiner* — Matthew Gitlin
(74) *Attorney, Agent, or Firm* — Sheridan Ross P.C.

(57) ABSTRACT

An underlayment system is provided that includes a plurality of protrusions that extend from a common base member. The protrusions and base member can include an opening therethrough that allows for subsequent layers of material, such as adhesive, to interact and bond to each other. The protrusions are arranged in such a way to contain a wire, string, or heating element, within a receiving area. The arrangement of the protrusions allow for routing of the wire, string, or heating element in a variety of angles, bends, and other routing layouts.

20 Claims, 5 Drawing Sheets

(56) References Cited

U.S. PATENT DOCUMENTS

| | | |
|---|---|---|
| 3,135,040 A | 6/1964 | Watson |
| 3,235,712 A | 2/1966 | Watson |
| 3,434,401 A | 3/1969 | Kiewit |
| 3,487,579 A | 1/1970 | Brettingen |
| 3,597,891 A | 8/1971 | Martin |
| 3,695,615 A | 10/1972 | Shoptaugh |
| 3,757,481 A | 9/1973 | Skinner |
| 4,016,692 A | 4/1977 | Jordan et al. |
| 4,183,167 A | 1/1980 | Jatich |
| 4,250,674 A | 2/1981 | Feist |
| 4,326,366 A | 4/1982 | Werner |
| 4,338,994 A | 7/1982 | Hewing et al. |
| 4,576,221 A | 3/1986 | Fennesz |
| 4,640,067 A | 2/1987 | Hagemann et al. |
| 4,640,854 A | 2/1987 | Radtke |
| 4,923,733 A | 5/1990 | Herbst |
| 4,995,471 A | 2/1991 | Hara et al. |
| 4,997,308 A | 3/1991 | Welling, Jr. |
| 5,042,569 A | 8/1991 | Siegmund |
| 5,052,161 A | 10/1991 | Whitacre |
| 5,078,203 A | 1/1992 | Shiroki |
| 5,105,595 A | 4/1992 | Tokei et al. |
| 5,131,458 A | 7/1992 | Bourne et al. |
| 5,374,466 A | 12/1994 | Bleasdale |
| 5,386,670 A | 2/1995 | Takeda et al. |
| 5,447,433 A | 9/1995 | Perry, Jr. |
| 5,480,259 A | 1/1996 | Thrower |
| 5,499,476 A | 3/1996 | Adams et al. |
| D370,034 S | 5/1996 | Kipfer |
| D372,158 S | 7/1996 | Bonaddio et al. |
| 5,585,154 A | 12/1996 | Rhoades |
| 5,789,462 A | 8/1998 | Motani et al. |
| 5,863,440 A | 1/1999 | Rink et al. |
| 6,076,315 A | 6/2000 | Kondo |
| 6,094,878 A | 8/2000 | Schluter |
| 6,178,662 B1 | 1/2001 | Legatzke |
| 6,434,901 B1 | 8/2002 | Schluter |
| 6,805,298 B1 | 10/2004 | Corbett |
| 6,918,217 B2 | 7/2005 | Jakob-Bamberg et al. |
| D508,332 S | 8/2005 | Julton |
| D541,396 S | 4/2007 | Fawcett et al. |
| 7,250,570 B1 | 7/2007 | Morand et al. |
| D551,152 S | 9/2007 | Funk et al. |
| D568,006 S | 4/2008 | Shin |
| D587,358 S | 2/2009 | Stephan et al. |
| 7,585,556 B2 | 9/2009 | Julton |
| 7,669,371 B2 | 3/2010 | Hill |
| 8,002,241 B1 | 8/2011 | Shaw |
| 8,020,783 B2 * | 9/2011 | Backman, Jr. .......... F24D 3/142 165/56 |
| 8,176,694 B2 | 5/2012 | Batori |
| 8,288,689 B1 | 10/2012 | Adelman |
| 8,573,901 B2 | 11/2013 | de Souza Filho et al. |
| D706,459 S | 6/2014 | Schluter et al. |
| D712,159 S | 9/2014 | Clerici et al. |
| 8,950,141 B2 | 2/2015 | Schluter et al. |
| 9,188,348 B2 | 11/2015 | Larson |
| 9,275,622 B2 | 3/2016 | Claeys et al. |
| 9,284,693 B2 | 3/2016 | Tabibnia |
| 9,416,979 B2 | 8/2016 | Larson |
| 2003/0024190 A1* | 2/2003 | Stanchfield ............. E04F 15/18 52/287.1 |
| 2005/0184066 A1 | 8/2005 | Brooks et al. |
| 2006/0260233 A1 | 11/2006 | Schluter |
| 2006/0265975 A1 | 11/2006 | Geffe |
| 2006/0278172 A1 | 12/2006 | Ragonetti et al. |
| 2007/0056233 A1 | 3/2007 | Kang et al. |
| 2008/0017725 A1 | 1/2008 | Backman, Jr. |
| 2008/0173060 A1 | 7/2008 | Cymbalisty et al. |
| 2008/0276557 A1 | 11/2008 | Rapaz |
| 2008/0290503 A1 | 11/2008 | Karavakis et al. |
| 2008/0290504 A1 | 11/2008 | Karavakis et al. |
| 2008/0295441 A1 | 12/2008 | Carolan et al. |
| 2009/0026192 A1 | 1/2009 | Fuhrman |
| 2009/0217605 A1* | 9/2009 | Batori ..................... E04F 15/18 52/220.2 |
| 2009/0230113 A1 | 9/2009 | Batori |
| 2011/0047907 A1* | 3/2011 | Smolka .................. F24D 13/024 52/220.1 |
| 2014/0069039 A1 | 3/2014 | Schluter et al. |
| 2015/0345155 A1* | 12/2015 | Pastrana ............... E04F 15/187 428/40.5 |
| 2016/0010327 A1 | 1/2016 | Larson |
| 2016/0047131 A1 | 2/2016 | Larson |

FOREIGN PATENT DOCUMENTS

| | | | |
|---|---|---|---|
| DE | 2840149 | 3/1980 | |
| DE | 8413516 | 10/1984 | |
| DE | 3317131 | 11/1984 | |
| DE | 3730144 | 4/1988 | |
| DE | 4201553 | 11/1992 | |
| DE | 9114591 | 3/1993 | |
| DE | 4230168 | 8/1993 | |
| DE | 4226312 | 2/1994 | |
| DE | 4242026 | 6/1994 | |
| DE | 29609497 | 8/1996 | |
| DE | 19750277 | 5/1999 | |
| DE | 19828607 | 12/1999 | |
| DE | 19936801 | 8/2000 | |
| DE | 19912922 | 1/2001 | |
| DE | 19912922 C1 * | 1/2001 | ............. F24D 3/141 |
| DE | 10040643 | 11/2001 | |
| DE | 202006013453 | 11/2006 | |
| DE | 102006004626 | 8/2007 | |
| DE | 102006004755 | 8/2007 | |
| EP | 60547 | 9/1982 | |
| EP | 74490 | 3/1983 | |
| EP | 133556 | 2/1985 | |
| EP | 189020 | 7/1986 | |
| EP | 367176 | 5/1990 | |
| EP | 368804 | 5/1990 | |
| EP | 437999 | 7/1991 | |
| EP | 514684 | 11/1992 | |
| EP | 0582031 | 2/1994 | |
| EP | 947778 | 10/1999 | |
| EP | 1054217 | 11/2000 | |
| EP | 1068413 | 1/2001 | |
| EP | 1074793 | 2/2001 | |
| EP | 1096079 | 5/2001 | |
| EP | 1338413 | 8/2003 | |
| EP | 1063478 | 10/2003 | |
| EP | 1208332 | 3/2004 | |
| EP | 1770337 | 4/2007 | |
| EP | 001079214-0005 | 3/2009 | |
| FR | 2695986 | 3/1994 | |
| FR | 2746426 | 9/1997 | |
| GB | 2006548 | 5/1979 | |
| GB | 2097836 | 11/1982 | |
| GB | 2364565 | 1/2002 | |
| GB | 2373042 | 9/2002 | |
| JP | H01-139935 | 6/1989 | |
| JP | H05-264051 | 10/1993 | |
| JP | 2008-025295 | 2/2008 | |
| WO | WO 82/03099 | 9/1982 | |
| WO | WO 95/22671 | 8/1995 | |
| WO | WO 2004/111544 | 12/2004 | |

OTHER PUBLICATIONS

Third Party Submission for U.S. Appl. No. 14/860,065, filed Jun. 23, 2016 25 pages.
Third Party Submission for U.S. Appl. No. 14/860,065, filed Jul. 8, 2016 26 pages.
Notice of Allowance for U.S. Appl. No. 14/860,065, mailed Sep. 14, 2016 10 pages.
U.S. Appl. No. 29/493,206, filed Jun. 6, 2014, Larson.
U.S. Appl. No. 29/547,874, filed Dec. 8, 2015, Larson.
U.S. Appl. No. 15/070,960, filed Mar. 15, 2016, Bordin et al.
U.S. Appl. No. 15/185,576, filed Jun. 17, 2016, Bordin.
U.S. Appl. No. 29/573,009, filed Aug. 2, 2016, Bordin.

(56) References Cited

OTHER PUBLICATIONS

U.S. Appl. No. 15/260,859, filed Sep. 9, 2016, Larson.
"5 Facts You May Not Know About Heated Flooring," southcypress.com, Sep. 12, 2015, 4 pages [retrieved Aug. 3, 2016 from: https://web.archive.org/web/20150912220312/http://www.southcypress.com/v3/articles/heated-flooring.htm].
"Ditra Heat," GlensFalls Tile & Supplies, Sep. 4, 2014, 1 page [retrieved Aug. 3, 2016 from: http://www.glensfallstile.com/general-tips/ditra-heat/772/].
"Illustrated price list BT 7," Schluter-Systems KG, Dec. 7, 28 pages.
Schluter Systems, Profile of Innovation, Illustrated Price List, Jan. 1, 2008, 2 pages.
International Search Report and Written Opinion for International (PCT) Patent Application No. PCT/US2015/045688, mailed Nov. 12, 2015 9 pages.
Official Action for U.S. Appl. No. 12/550,111, mailed Apr. 26, 2013 12 pages.
Official Action for U.S. Appl. No. 12/550,111, mailed Dec. 5, 2013 14 pages.
Official Action for U.S. Appl. No. 12/550,111, mailed Jan. 23, 2015 16 pages.
Notice of Allowance for U.S. Appl. No. 12/550,111, mailed Aug. 28, 2015 11 pages.
Notice of Allowance for U.S. Appl. No. 12/550,111, mailed Sep. 22, 2015 10 pages.
Official Action for U.S. Appl. No. 29/493,206, mailed Nov. 19, 2015 4 pages Restriction Requirement.
Official Action for U.S. Appl. No. 29/493,206, mailed Aug. 10, 2016 8 pages.
Official Action for U.S. Appl. No. 29/547,874, mailed Aug. 10, 2016 8 pages.
Official Action for U.S. Appl. No. 14/860,065, mailed Mar. 15, 2016, 6 pages.
Third Party Submission for U.S. Appl. No. 14/860,065, mailed Apr. 28, 2016, 18 pages.
Notice of Allowance for U.S. Appl. No. 14/880,859, mailed Mar. 7, 2016, 16 pages.
Official Action for U.S. Appl. No. 14/829,108, mailed Jan. 20, 2016, 10 pages.
Third Party Submission for U.S. Appl. No. 14/829,108, mailed Aug. 17, 2016, 17 pages.
Official Action for U.S. Appl. No. 14/829,108, mailed Aug. 18, 2016 5 pages Restriction Requirement.
Official Action for U.S. Appl. No. 15/070,960, mailed Aug. 26, 2016 9 pages.
Official Action for U.S. Appl. No. 15/185,576, mailed Aug. 24, 2016 14 pages.
Official Action for U.S. Appl. No. 14/523,557, mailed Nov. 24, 2015, 11 pages.
Official Action for U.S. Appl. No. 14/523,557, mailed Mar. 26, 2015, 14 pages.

\* cited by examiner

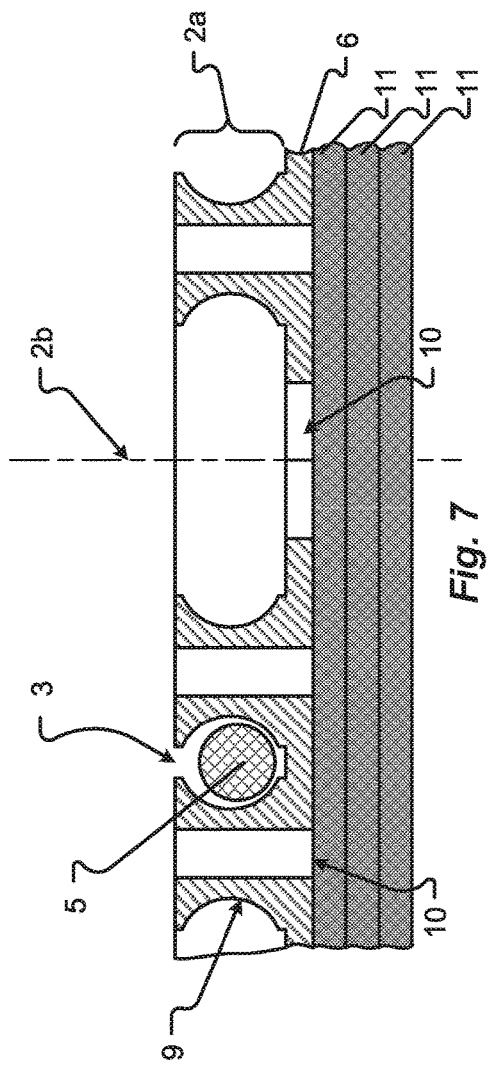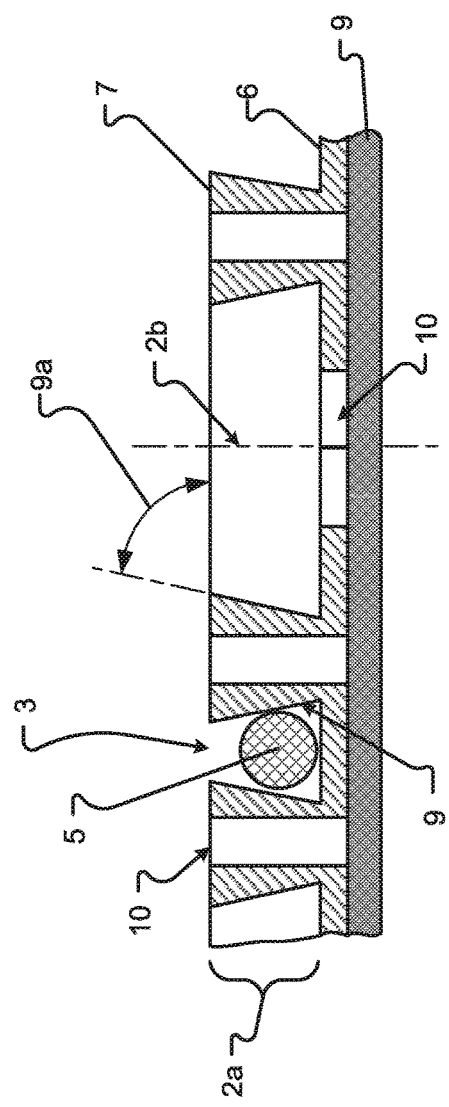

METHOD AND APPARATUS FOR POSITIONING HEATING ELEMENTS

CROSS REFERENCE TO RELATED APPLICATIONS

The present application claims the benefit of U.S. patent application Ser. No. 14/829,108, filed Aug. 18, 2015, which claims the benefit of U.S. Provisional Patent Application Ser. No. 62/038,733, filed Aug. 18, 2014, both of which are fully incorporated by reference herein.

FIELD OF THE INVENTION

Embodiments of the present invention are generally related to underlayments associated with radiant floor or wall heating systems.

BACKGROUND

In-floor and in-wall heating and cooling is well known that utilizes heat conduction and radiant heat, for example, for indoor climate control rather than forced air heating that relies on convection. The heat is usually generated by a series of pipes that circulate heated water or by electric cable, mesh, or film that provide heat when a current is applied thereto. In-floor radiant heating technology is used commonly in homes and businesses today.

Electrical floor heating systems have very low installation costs and are well suited for kitchens, bathrooms, or in rooms that require additional heat, such as basements. One advantage of electric floor heating is the height of installation. For example, floor buildup can be as little as about one millimeter as the electric cables are usually associated with a specialized installation board or directly onto the sub floor. Electric underfloor heating is also installed very quickly, usually taking a half a day to a day depending on the size of the area to be heated. In addition, warm up times are generally decreased because the cables are installed approximate to the finished flooring, e.g., tile, wherein direct connection is made with the heat source rather than a stored water heater as in fluid-based systems. Electric systems are offered in several different forms, such as those that utilize a long continuous length cable or those that employ a mat with embedded heating elements. In order to maximize heat transfer, a bronze screen or carbon film heating element may be also used. Carbon film systems are normally installed under the wire and onto a thin insulation underlay to reduce thermal loss to the sub floor. Vinyls, carpets, and other soft floor finishes can be heated using carbon film elements or bronze screen elements.

Another type of in-floor heating system is based on the circulation of hot water, i.e., a "hydronic" system. In a hydronic system, warm water is circulated through pipes or tubes that are incorporated into the floor and generally uses pipes from about $11/16$ inch to 1 inch to circulate hot water from which the heat emanates. The size of tubes generally translates into a thicker floor, which may be undesirable. One other disadvantage of a hydronic system is that a hot water storage tank must be maintained at all times, which is less efficient than an electric floor heating system.

In order to facilitate even heating of a floor, the wires must preferably be spaced at specific locations. One such system is disclosed in U.S. Patent Application Publication No. 2009/0026192 to Fuhrman ("Fuhrman"), which is incorporated by reference in its entirety herein. Fuhrman discloses a mat with a plurality of studs extending therefrom that help dictate the location of the wires. The mat with associated studs is placed over a sub floor with a layer of adhesive therebetween. Another layer of adhesive is placed above of the studs. The studs also guide the finishers to form a correct floor thickness. The studs thus provide a location for interweaving the wire or wires that are used in the heating system. The wire of Fuhrman, however, is not secured between adjacent studs and still may separate therefrom, which may cause uneven heating or wire damage. Furthermore, Fuhrman discloses a continuous mat wherein subsequent layers of adhesive are not able to interact with those previously placed.

SUMMARY

It is with respect to the above issues and other problems that the embodiments presented herein were contemplated. In general, embodiments of the present disclosure provide methods, devices, and systems by which various elements, such as wire, heating elements, and the like, may be routed and/or contained in a flooring underlayment. In one embodiment, the underlayment may include a number of protrusions extending from a base material. The protrusions may be configured in a cluster, or array, or even as part of another protrusion, forming routing hubs. As provided herein, a wire may be routed around, through, and even around and through the routing hubs and/or protrusions. The unique shape and arrangement of the protrusions disclosed herein can provide for the efficient routing of wires in an underlayment for any shape and/or purpose.

In some embodiments, the protrusion forms a geometric shape extending away from a base material surface to a contact surface (e.g., the contact surface for flooring, tile, etc.). This extension between the base material surface and the contact surface defines the overall protrusion height. The protrusion may include a number of sides extending from the base material to the contact surface. As can be appreciated, at least one of the sides of the protrusion may include a surface configured to receive a wire. This receiving surface can be concave, convex, arcuate, linear, etc., and/or combinations thereof. Additionally or alternatively, the surface may follow, or contour, the geometric shape of the protrusion.

It is an aspect of the present disclosure that at least two protrusions are arranged adjacent to one another on an underlayment base material. In one embodiment, the protrusions may be arranged such that the receiving surface of a first protrusion is offset from and facing the receiving surface of a second protrusion. The distance of the offset and the receiving surfaces can form a receiving cavity configured to receive a wire, heating element, or other element. For example, an underlayment may include a number of protrusions arranged about an array axis to form a routing hub. Where four protrusions make up a routing hub, there may exist heating element receiving cavities disposed between each protrusion. Additionally or alternatively, the underlayment may include a number of routing hubs equally-spaced along a first linear direction and/or a second linear direction to form a matrix of routing hubs. In this case, additional heating element receiving cavities may be disposed between each routing hub. As can be appreciated, the matrix of routing hubs and the array of protrusions allow for heating elements to be routed in the underlayment according to any configuration of routing curves, angles, and/or lines.

In some embodiments, the protrusions, base material, and/or other features of the underlayment may be formed into a shape from at least one material. Examples of forming can include, but are not limited to, thermoforming, thermomolding, injection molding, casting, molding, rotational molding, reaction injection, blow molding, vacuum forming, twin sheet forming, compression molding, machining, 3D printing, etc., and/or combinations thereof.

The protrusions, base material, and/or other features of the underlayment may include a number of cutouts, or holes. In some embodiments, the cutouts can extend at least partially into the protrusion, base material, and/or the underlayment. In one embodiment, one or more of the cutouts may completely pass through the underlayment. In any event, the cutouts may be configured to receive a mating material. For instance, the cutouts may be configured to receive adhesive, epoxy, grout, cement, glue, plastic, or other material capable of flowing at least partially into the cutouts. These cutouts can provide a number of surfaces on the underlayment to which material can adhere, or key. Additionally or alternatively, these cutouts can increase the strength of the underlayment by providing a structural skeleton, around which material can flow and cure in addition to providing a pathway for airflow, thereby enabling the utilization of a modified thinset, which requires air for curing. The cutouts further provide a passageway for moisture to flow out of the subfloor. In one embodiment, the cutouts may be provided via the forming process of the underlayment. In another embodiment, the cutouts may be made via a cutting operation performed prior to the forming process. In yet another embodiment, the cutouts may be made via a cutting operation performed subsequent to the forming process.

The underlayment may include areas in and/or between the routing hubs that are configured to receive material. For instance, the areas may be configured to receive adhesive, epoxy, grout, cement, glue, plastic, or other material capable of flowing at least partially into the areas. These areas can provide a number of surfaces on the underlayment to which material can adhere, or key. Additionally or alternatively, these areas can increase the strength of the underlayment by providing a structural skeleton, around which material can flow and cure.

In some embodiments, the underlayment may include a pad layer. The pad layer may include a sound dampening material, heat reflective material, insulative material, porous substrate, vapor barrier, waterproof material, energy reflective material, etc., and/or combinations thereof. Examples of pad layers can include, but are in no way limited to, foil, cork, rubber, plastic, concrete, wood, organic materials, inorganic materials, composites, compounds, etc., and/or combinations thereof. The pad layer may be attached to the base material via adhesive, thermal bonding, welding, mechanical attachment, etc., and/or combinations thereof. As can be appreciated, the pad layer may include adhesive on the side opposite the base material side for affixing to a surface, such as a subfloor, floor, etc. In one embodiment, the pad layer may be configured to receive adhesive for affixing to a surface.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_0$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 7 shows a detail cross-sectional view of a first embodiment of the routing hubs taken along line D-D shown in FIG. 6; and FIG. 8 shows a detail cross-sectional view of a second embodiment of the routing hubs taken along line D-D shown in FIG. 6.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
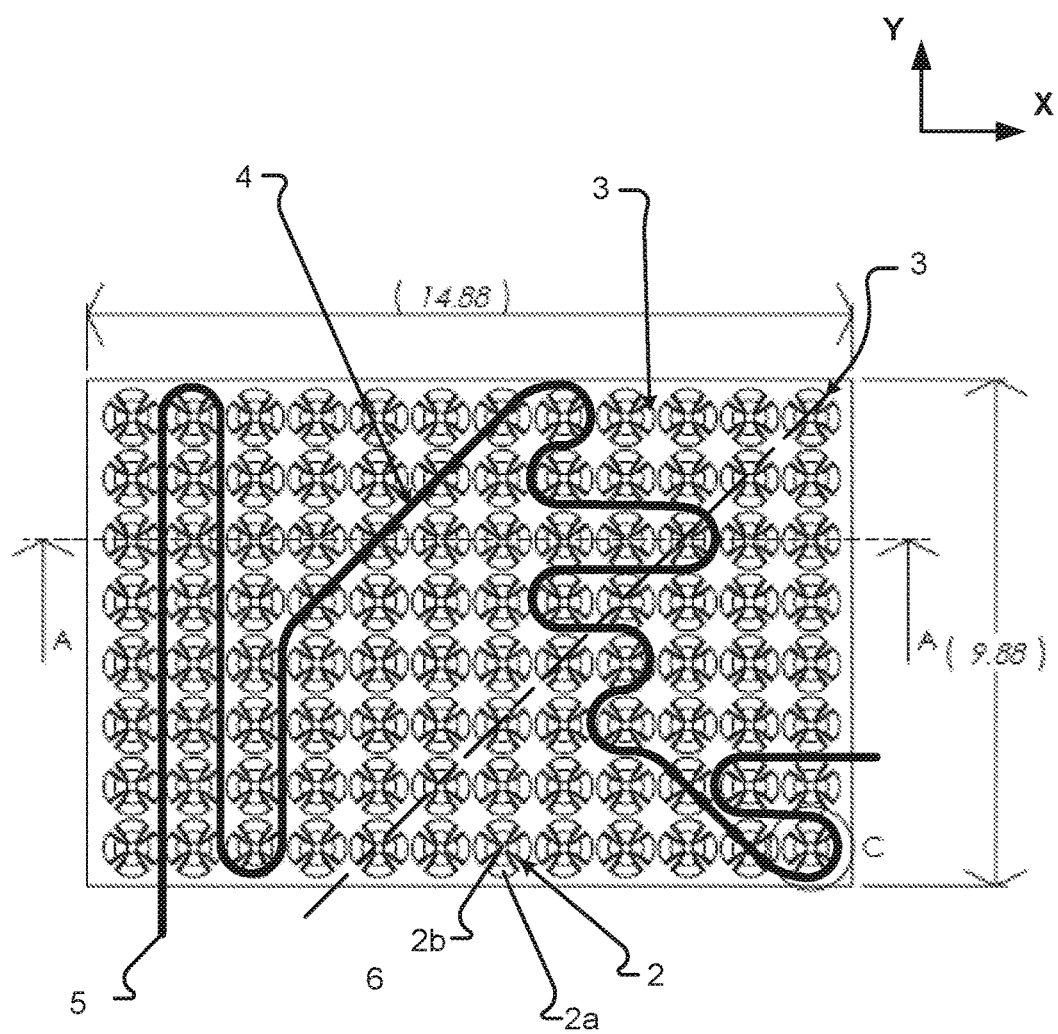
FIG. 1 shows a plan view of an underlayment section in accordance with embodiments of the present disclosure.

FIG. 1 shows a plan view of an underlayment section 1 in accordance with embodiments of the present disclosure. The underlayment section 1 includes a number of routing hubs 2, comprising four protrusions 2a arranged in an equally-spaced circular array about an array axis 2b, in a matrix configuration. The matrix is configured in the form of an eight row by twelve column matrix of routing hubs 2. The matrix provides heating element receiving cavities 3 in the X-direction, Y-direction, and in directions approximately 45 degrees to the X-direction and/or the Y-direction. A sample routing 4 of the heating element 5 is shown in FIG. 1. In particular, the heating element section 5 shown runs along the Y-direction between the first and second columns of routing hubs 2, proceeds around the routing hub 2 in the first row and second column (2, 8) and along the negative Y-direction between the second and third columns to the (3, 1) routing hub 2, proceeds along the Y-direction between the third and fourth columns until about the (3, 4) routing hub 2, and then proceeds diagonally through the heating element receiving cavities 3 in the (4, 5), (5, 6), (6, 7), and (7, 8) routing hubs 2, and so on.

Figure 2:
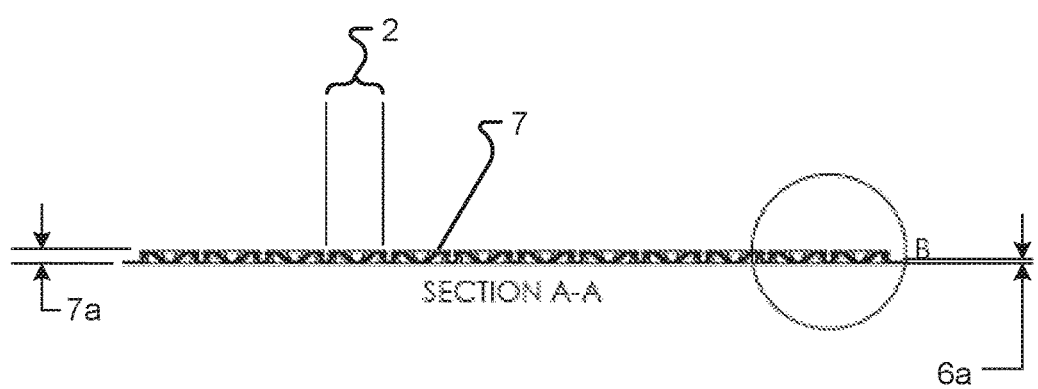
FIG. 2 shows a cross-sectional view of an area of the underlayment taken along line A-A shown in FIG. 1.

FIG. 2 shows a cross-sectional view of an area of the underlayment 1 taken along line A-A. In some embodiments, one or more of the protrusions 2a can extend from the base material surface 6 to a contact surface 7. The contact surface 7 may be configured to support tile, flooring, or other material. The distance from the base material 6 to the contact surface 7 is called the protrusion height 7a. The thickness of the base material 6 is called the base thickness 6a. In some embodiments, the protrusions 2a may be formed from the base material 6, and as such, may have a wall thickness approximately equal to that of the base thickness 6a.

Figure 3:
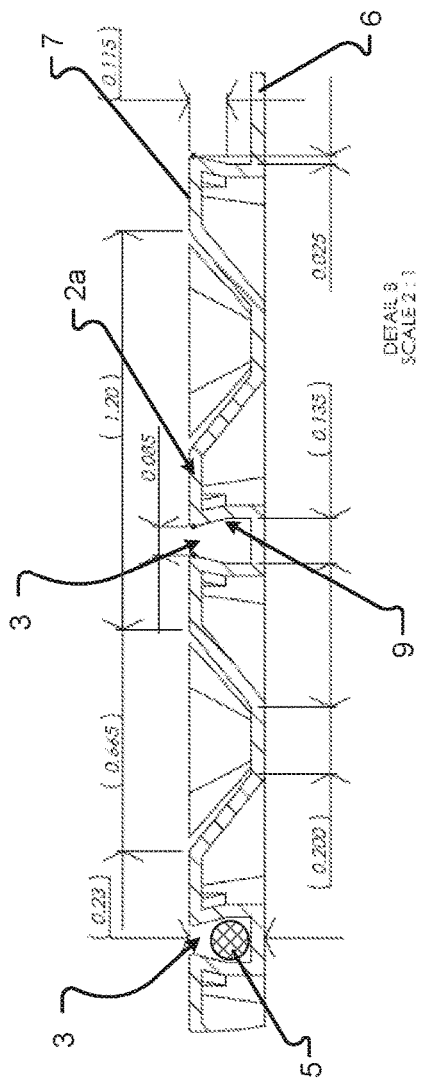
FIG. 3 shows a detail cross-sectional view of an area of the underlayment in accordance with embodiments of the present disclosure.

FIG. 3 shows a detail cross-sectional view of an area of the underlayment 1 in accordance with embodiments of the present disclosure. In one embodiment, the areas adjacent to each protrusion 2a can form a heating element receiving cavity 3. Each heating element receiving cavity 3 can include an interference fit 8, or contained area, to hold a heating element 5 or wire in place. In some cases, the heating element 5 may be inserted into the heating element receiving cavity 3 with a predetermined amount of force required to part (e.g., elastically deform, plastically deform, flex, and/or deflect, etc.) at least one of the receiving surfaces 9 of the cavity. In one embodiment, when the heating element 5 is inserted into the heating element receiving cavity 3 the at least one of the receiving surfaces 9 may return to an original position thereby closing the heating element receiving cavity 3 and containing the heating element 5.

Figure 4:
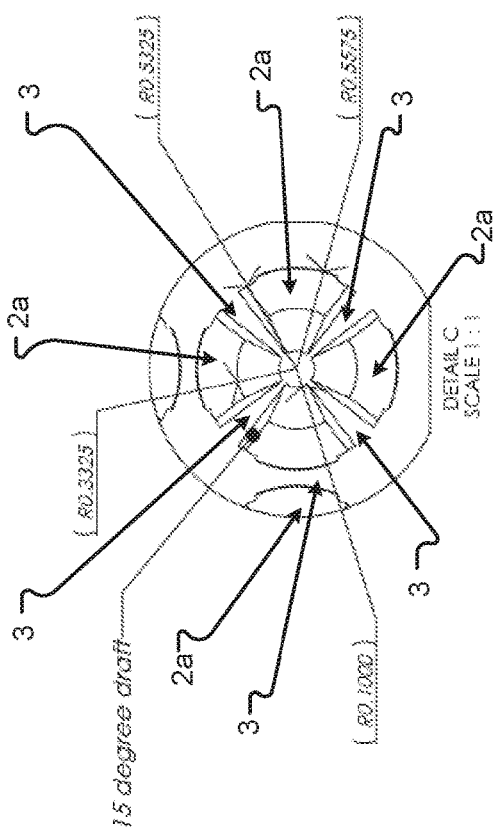
FIG. 4 shows a detail plan view of a routing hub of the underlayment in accordance with embodiments of the present disclosure.

FIG. 4 shows a detail plan view of a routing hub 2 of the underlayment 1 in accordance with embodiments of the present disclosure. The heating element receiving cavities 3 are shown disposed between protrusions 2a and/or routing hubs 2. In some embodiments, one or more of the heating element receiving cavities 3 can be configured differently from another heating element receiving cavity 3. For instance, several heating element receiving cavities 3 may be configured to provide a frictional fit for holding a heating element 5, while other heating element receiving cavities 3 may be configured to merely contain a heating element 5. In any event, the underlayment 1 can include one or more configurations of heating element receiving cavity 3.

Figure 5:
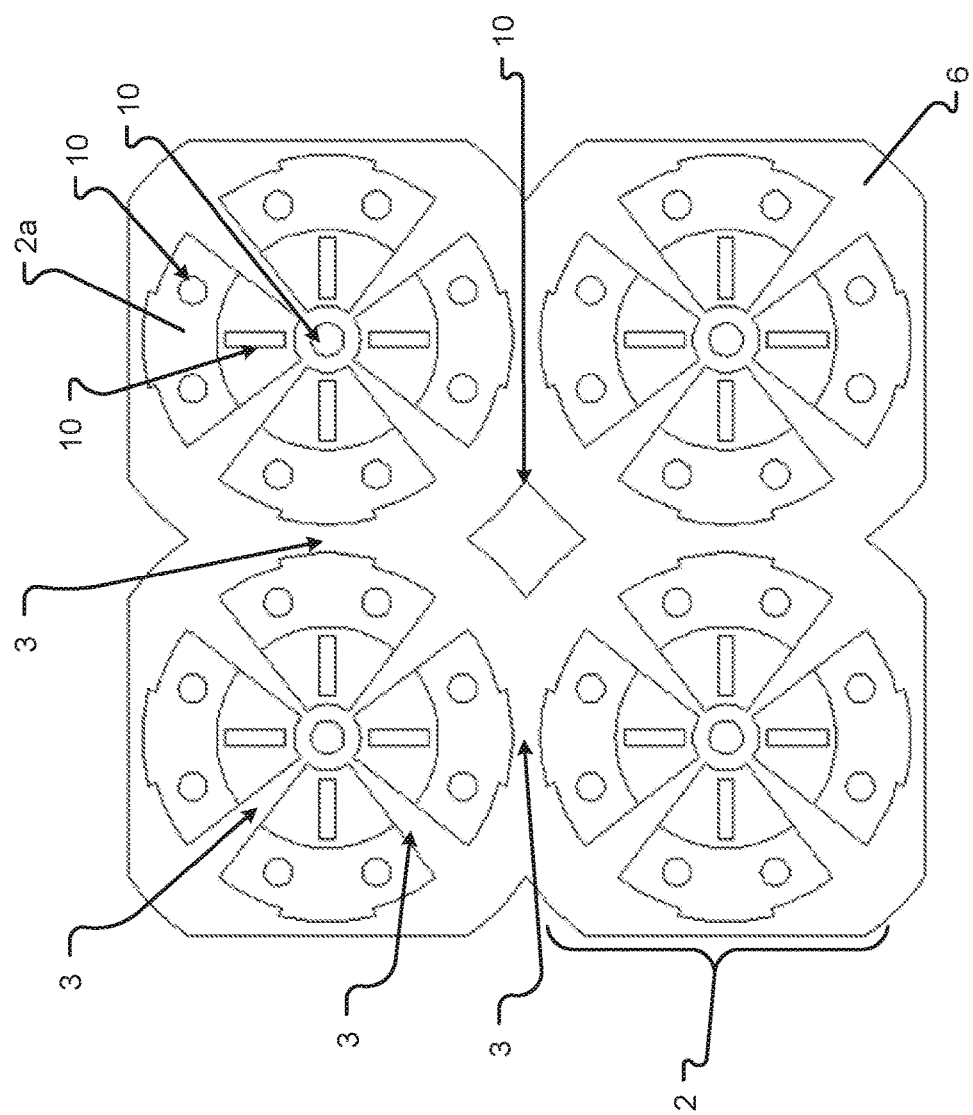
FIG. 5 shows a plan view of routing hubs of an underlayment in accordance with a first embodiment of the present disclosure.

FIG. 5 shows a plan view of routing hubs 2 of an underlayment 1 in accordance with a first embodiment of the present disclosure. As described above, the protrusions 2a, base material 6, and/or other features of the underlayment 1 may include a number of cutouts 10, or holes. In some embodiments, the cutouts 10 can extend at least partially into the protrusion 2a, base material 6, and/or the underlayment 1. In some embodiments, the cutouts 10 are shown as extending at least partially into at least one side of at least one protrusion 2a.

Figure 6:
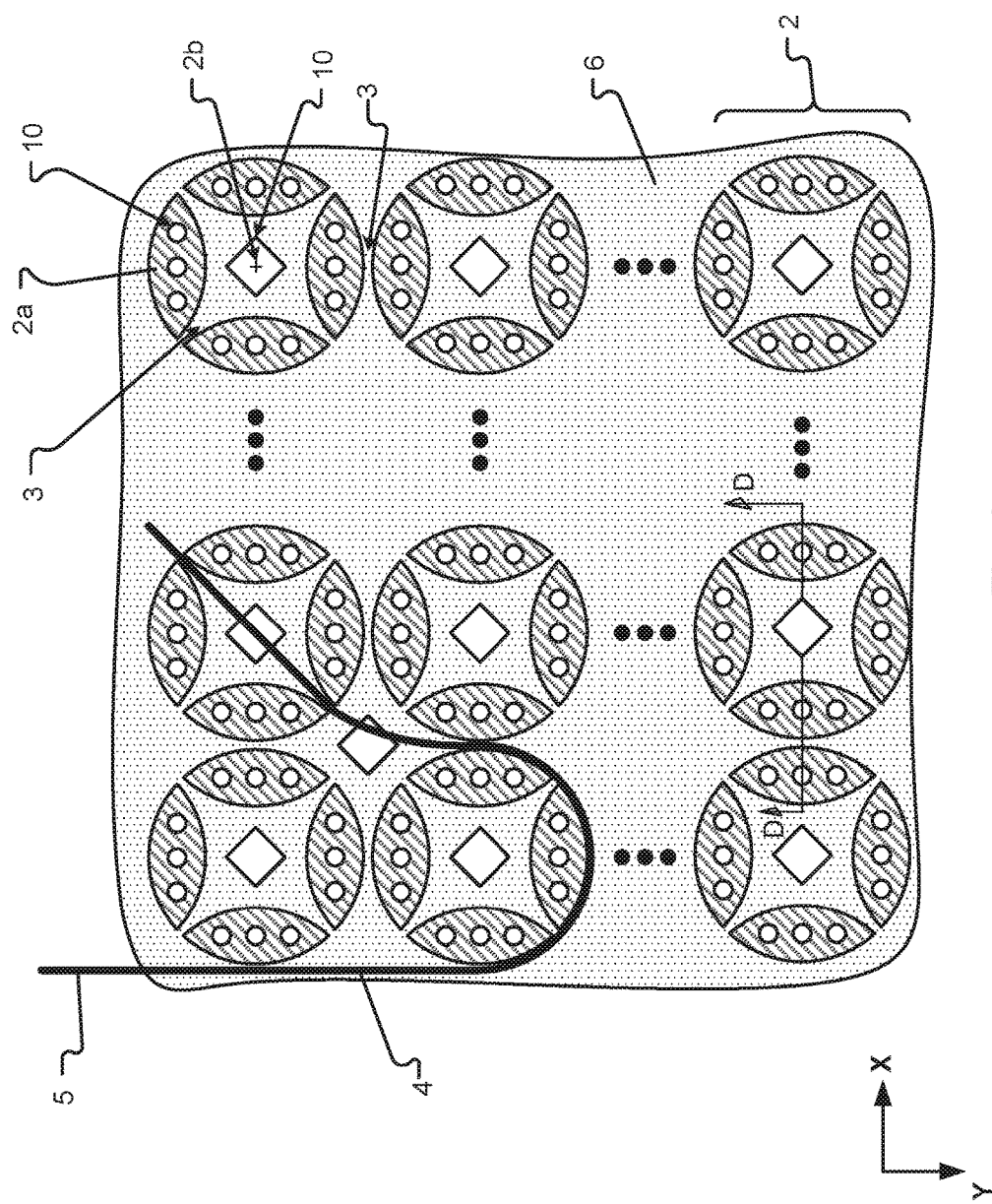
FIG. 6 shows a plan view of routing hubs of an underlayment in accordance with a second embodiment of the present disclosure.

FIG. 6 shows a plan view of routing hubs 2 of an underlayment 1 in accordance with a second embodiment of the present disclosure. The underlayment 1 section includes a number of routing hubs 2, comprising four protrusions 2a arranged in an equally-spaced circular array about an array axis 2b, in a matrix configuration. A sample routing 4 of the heating element 5 is shown in FIG. 6. In particular, the heating element section 5 shown runs along the Y-direction of the first column of routing hubs 2, proceeds around the routing hub 2 in the second row and first column (1, 2) and along the negative Y-direction between the first and second columns, and then proceeds diagonally through the heating element receiving cavity 3 in the (2, 1) routing hub 2.

FIG. 7 shows a detail cross-sectional view of a first embodiment of the routing hubs 2 taken along line D-D shown in FIG. 6. As shown, the heating element receiving cavity 3 in FIG. 7 includes arcuate receiving surfaces 9. The arcuate receiving surfaces 9 may be configured as concave, curvilinear, arched, and/or other shape configured to receive the heating element 5. In some cases, at least one of the arcuate receiving surfaces 9 of the routing hubs may be configured to contact the heating element receiving cavity 3. The contact may provide a frictional force that retains the heating element 5 in the underlayment 1. In some embodiments, the arcuate receiving surfaces 9 may contain the heating elements 5 in the heating element receiving cavity 5 without frictional contact.

Additionally or alternatively, the underlayment 1 may include a pad layer 11. The pad layer 11 may include a sound dampening material, heat reflective material, insulative material, porous substrate, vapor barrier, waterproof material, energy reflective material, etc., and/or combinations thereof. Examples of pad layers 11 can include, but are in no way limited to, foil, cork, rubber, plastic, concrete, wood, organic materials, inorganic materials, composites, compounds, etc., and/or combinations thereof. The pad layer 11 may be attached to the base material 6 via adhesive, thermal bonding, welding, mechanical attachment, etc., and/or combinations thereof. As can be appreciated, the pad layer 11 may include adhesive on the side opposite the base material 6 side for affixing to a surface, such as a subfloor, floor, etc. In one embodiment, the pad layer 11 may be configured to receive adhesive for affixing to a surface. It should be appreciated that any of the underlayment 1 embodiments as disclosed may include such a pad layer 11. In some embodiments, there may be additional pad layers 11, one above another (e.g., a stack of two, three, four, five, or more pad layers 11) for strengthening and controlling anti-fracture. This enables isolation of cracks in a substrate from traveling to the tile layer.

FIG. 8 shows a detail cross-sectional view of a second embodiment of the routing hubs 2 taken along line D-D shown in FIG. 6. As shown, the heating element receiving cavity 3 in FIG. 8 includes angular receiving surfaces 9. The angular receiving surfaces 9 may be configured as a draft angle 9a, a dovetail, a "V" shape, or other channel shape configured to receive the heating element 5. In some cases, at least one of the angular receiving surfaces 9 of the routing hubs 2 may be configured to contact the heating element receiving cavity 3. The contact may provide a frictional force that retains the heating element 5 in the underlayment 1. In some embodiments, the angular receiving surfaces 9 may contain the heating elements 5 in the heating element receiving cavity 5 without frictional contact.

The exemplary systems and methods of this disclosure have been described in relation to electronic shot placement detecting systems and methods. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An underlayment adapted to receive and secure at least one heating element of a radiant heating assembly, comprising:
    a base material defining an area and having a first side and a second side disposed opposite the first side;
    a plurality of routing hubs disposed on said first side of said base material, each routing hub comprising a top surface, at least one exterior wall, and a series of equally spaced interior walls, each of the series of equally spaced interior walls defining a portion of an interior cavity of the routing hub and comprising a cutout portion that extends from a surface of the interior wall away from the interior cavity and toward the base material, wherein at least a portion of the exterior wall is curved around a vertical axis; and
    a heating element receiving cavity formed between the at least one exterior wall of adjacent ones of said plurality of routing hubs,
    wherein a horizontal distance between the at least one exterior wall of adjacent ones of said plurality of routing hubs is equal to or less than a height of the top surface of one of the adjacent ones of said plurality of routing hubs above the first side of the base material.

2. The underlayment of claim 1, wherein each routing hub comprises a plurality of protrusions.

3. The underlayment of claim 1, wherein said cutout portion is adapted to receive at least one of adhesive, epoxy, grout, cement, glue, and plastic.

4. The underlayment of claim 1, wherein said plurality of routing hubs is formed from the base material.

5. The underlayment of claim 1, wherein said plurality of routing hubs is arranged in a matrix configuration.

6. The underlayment of claim 1, wherein said heating element receiving cavity further comprises a receiving surface adapted to retain a heating element.

7. The underlayment of claim 6, wherein the base material forms a substantially continuous bottom surface of the heating element receiving cavity.

8. The underlayment of claim 1, further comprising:
a pad layer, wherein a first side of said pad layer is attached to the second side of said base material and a second side of said pad layer, opposite the first side of the pad layer, comprises adhesive for affixing the underlayment to a surface.

9. The underlayment of claim 8, wherein the pad layer is attached to the second side by at least one of adhesive, thermal bonding, welding, and mechanical attachment.

10. The underlayment of claim 8, further comprising a heating element positioned within the heating element receiving cavity.

11. A heating element routing device, comprising:
a base material defining an area and having a first side and a second side opposite the first side;
a pad layer attached to the second side;
a plurality of protrusions extending from the first side, each protrusion having an upper surface connecting a curved outer wall to a curved inner wall, a cutout extending from a surface of the curved inner wall at least partially into the protrusion, the curved outer wall of each protrusion curved around a vertical axis and positioned at a first distance from and facing the curved outer wall of another protrusion to form a receiving cavity therebetween, the receiving cavity having a first width at a first height above the first side, and a second width at a second height above the first side, the second height being greater than the first height and the first width being greater than the second width,
wherein the first distance is less than or equal to a height of the upper surface above the first side of the base material.

12. The heating element routing device of claim 11, further comprising a heating element positioned in the receiving cavity.

13. The heating element routing device of claim 11, wherein the pad layer comprises an anti-fracture membrane.

14. The heating element routing device of claim 11, wherein the pad layer is attached to the second side by at least one of adhesive, thermal bonding, welding, or mechanical attachment.

15. The heating element routing device of claim 11, further comprising a plurality of pad layers, each formed separately from the base material.

16. The heating element routing device of claim 11, wherein the upper surface of each protrusion is the same height above the first side of the base material.

17. A flooring underlayment comprising:
a base material defining an area and having a first side and a second side opposite the first side;
a pad layer attached to the second side;
a plurality of routing hubs arranged in a matrix on the first side, each routing hub having an upper surface connecting a curved outer wall to a curved inner wall, the curved outer wall curved around a vertical axis, a cutout extending toward the base material from a surface of the curved inner wall, the curved outer walls of adjacent routing hubs forming a receiving cavity therebetween having an open top, a closed bottom, and a minimum width that is less than a height of the upper surface above the first side of the base material, the receiving cavity further having a first width at a height between the open top and the closed bottom that is greater than a second width at the open top.

18. The flooring underlayment of claim 17, further comprising a heating element positioned in the receiving cavity.

19. The flooring underlayment of claim 17, wherein the pad layer comprises an anti-fracture membrane.

20. The flooring underlayment of claim 17, wherein the pad layer is attached to the second side by at least one of adhesive, thermal bonding, welding, or mechanical attachment.

* * * * *